United States Patent [19]
Tolle et al.

[11] Patent Number: 6,034,705
[45] Date of Patent: Mar. 7, 2000

[54] THERMAL PRINTER CONTROL SYSTEM

[75] Inventors: Charles V. Tolle, Encino; Gary L. Mallaley, Thousand Oaks; Robert P. Johnson, Santa Clarita, all of Calif.

[73] Assignee: Datametrics Corp., Florham Park, N.J.

[21] Appl. No.: 08/657,025

[22] Filed: May 29, 1996

Related U.S. Application Data

[62] Division of application No. 08/078,729, Jun. 17, 1993, abandoned.

[51] Int. Cl.$^7$ ........................................... B41J 2/36
[52] U.S. Cl. ................................................. 347/195
[58] Field of Search ........................ 347/195; 400/120.15

[56] References Cited

U.S. PATENT DOCUMENTS

| | | |
|---|---|---|
| 4,284,876 | 8/1981 | Ishibashi et al. . |
| 4,709,149 | 11/1987 | Takahashi et al. . |
| 4,804,976 | 2/1989 | Ohmori et al. . |
| 4,806,950 | 2/1989 | Sekine et al. . |
| 5,038,154 | 8/1991 | Yamamoto et al. ..................... 347/195 |

FOREIGN PATENT DOCUMENTS

| | | |
|---|---|---|
| 0 138 221 A2 | 4/1985 | European Pat. Off. . |
| 0 159 703 A3 | 10/1985 | European Pat. Off. . |
| 0 245 006 A1 | 11/1987 | European Pat. Off. . |
| 0 351 754 A2 | 1/1990 | European Pat. Off. . |
| 0 437 236 A2 | 7/1991 | European Pat. Off. . |
| 88/08656 | 11/1988 | WIPO . |

*Primary Examiner*—Huan Tran

[57] ABSTRACT

An improved thermal printer has circuits that are responsive to selected parameters of the printer and to the contents of a document to be printed to selectively enable the individual printing electrodes with printing impulses of varying energy depending upon when the electrode had printed. Other circuits cause the selective process to be responsive to whether electrodes adjacent a selected electrode had printed and how recently such printing took place. In different embodiments, circuits utilize not only the history of a selected electrode and its neighbors, the as yet unprinted portion of the document to be printed is utilized to aid in the selection of an appropriate printing impulse.

3 Claims, 12 Drawing Sheets

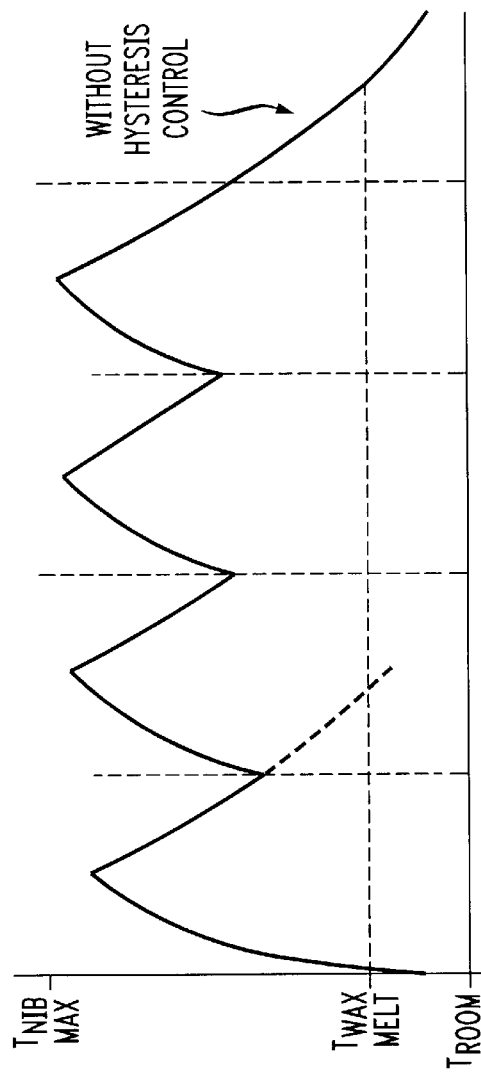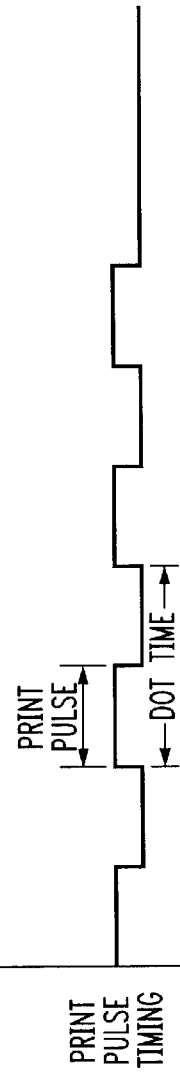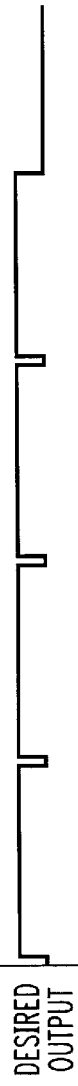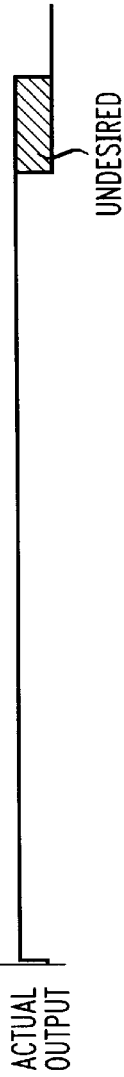
FIG. 5a
FIG. 5b
FIG. 5c
FIG. 5d

| $N_{-1,-1}$ | $N_{0,-1}$ | $N_{+1,-1}$ |
| --- | --- | --- |
| $N_{-1,0}$ | $N_{0,0}$ | $N_{+1,0}$ |
| $N_{1,+1}$ | $N_{0,+1}$ | $N_{+1,+1}$ |

THERMAL PRINTER CONTROL SYSTEM

This is a divisional of application Ser. No. 08/078,729, filed on Jun. 17, 1993, now abandoned, the filing date of which is claimed under 35 U.S.C. §120.

BACKGROUND OF THE INVENTION

1. Field of the Invention

The present invention relates to color printers and, more particularly a high speed thermal color printer for combining sequentially applied monochrome images into a full color image in a single pass of the medium.

One available process (dye diffusion thermal transfer or "D2T2") uses a ribbon which is impregnated with a dye that can be made to diffuse into the surface of a medium. Because this method depends on the diffusion of the dye into the medium, it is a relatively slow process and high speed media movement is not a requirement given the limitations of presently available dyes.

A second process, approximately ten times faster, uses colored wax "ribbons" (thermal wax transfer process or "TWT"). At the present time, full color printers are available that work in the thermal wax transfer ("TWT") process in which a print head having a plurality of individually addressable electrodes that can be selectively heated transfers dots of wax from a ribbon to a medium, usually paper. Such printers are generally designed to work at a print density of up to 400 dots per inch.

Complete images in full color are created by sequentially depositing colored wax dots in complete or partial superposition such that several colors can be created, much in the fashion of multicolor impression printing in which several engraved image plates are inked, each in a single color and each ink image is separately transferred to the medium. In most color print systems, images in each of three primary colors together with black, are printed in registration so that the finished picture is a composite image. The color in any incremental area of the finished print is determined by the relative amounts of each primary color present in that incremental area.

To print in the thermal wax transfer process, an individual printing electrode is heated by passing an electrical current through the electrode. A film carrying wax of a single color is placed in intimate contact with a web, conventionally paper, upon whose surface a wax dot is to be deposited. The "sandwich" thus formed is held against the electrode by a roller which acts as both a platen and a heat sink. Where the temperature of the film exceeds the melting temperature of the wax, a small area of wax melts. Additional amounts of heat must be supplied to melt sufficient wax for the creation on the medium of a mark of the desired size. At the cooler print medium, the wax starts to chill and begins to re-solidify.

The medium and ribbon are permitted to remain in contact during travel away from the print head, during which time the re-solidifying wax preferentially adheres to the medium rather than the ribbon. The ribbon is then separated from the web and travels to a take up roll. The web medium travels to the next print station where the printing process is repeated with a wax of a different color.

In printing on a moving web, it is important to determine where a dot is to be deposited. It is also important to determine when the mark is to be deposited. With conventional printers of the prior art, usually the time available for depositing a line of colored dots was sufficient to permit printing whenever it was reasonably certain that the correct printing location for a line of marks had arrived at the print head. When the printing location for the next line of marks reached the print head, the next line was printed.

As the web moves, there are "windows" of opportunity within which a dot row must be printed. If the human eye is to be satisfied with the result, the dots must be aligned in a direction transverse to the direction of travel of the medium and the spacing between adjacent lines must be uniform. Further, and depending upon the subject matter of a document, the alignment and registration requirements may be quite stringent because of the sensitivity of the eye to misalignments, especially in patterns that include straight lines and smooth curves.

It would be desirable to have a relatively high speed (up to approximately 12 inches per second or greater) full color (three primary colors plus black) thermal printer that can reliably and repeatably produce images that accurately represent a "picture". The source of images may be an image file in a computer and result from the manipulation of an image creating computer program. It is equally possible to "scan" color "documents" from a variety of sources into a computer file using presently available scanners and programs. Such "documents" can be printed using a color printer without the need of creating a plurality of engraved printing plates.

Such a printer should have a resolution of up to 600 "dots per inch" (dpi) and greater and be capable of printing upon various media including paper, fabric, plastic film or metallic foils. The color palette should permit a range of colors and hues sufficient for perception by the human eye. Generally a color range of at least 8 shades for each primary color and black, which can be represented by up to 32 data bits should suffice.

So that monochromatic ribbons can be used in the printing process and to obviate the need for reversing web travel between colors, four dedicated printing heads should be serially arranged in the path of the moving web. The printed images from each of the print heads should maintain accurate registration and the row-to-row spacing of adjacent printed rows should remain constant.

According to the present invention, a full color thermal printer capable of achieving print speeds of greater than 6 inches per second utilizes digital computers and a mechanical position sensor to assist in determining not only the "time window" during which the dot row to be printed will be available to the print head, but also the optimum time, duration and magnitude of electrical impulses which are to be applied to the individual electrodes of a thermal print head to effectuate printing of a mark.

A high resolution encoder signals paper travel through the printer to the computer and to a counter. Individual registers are provided for each print head. Within each register is stored a number representing a length of web. A first register holds a number whose value represents a length of web sufficient for acceleration from a rest position to a steady state velocity. In other registers, numbers are stored whose value equals the sum of the first register number plus other numbers whose value represents the distance between printing heads. These numbers are automatically updated with a number whose value represents a correction for thermal expansion or contraction of the entire mechanism.

Each of the registers has an associated comparator whose second input is connected to the counter. When the counter value reaches the value of the number stored in a register, the associated comparator generates an actuating signal which is applied to the associated printing circuits.

According to a preferred embodiment, the several registers are loaded with constants which are stored in the computer and the web is advanced. The constants are precisely corrected to reflect actual distances after test print runs are made to check registration of the printed dot rows. By correcting the constants, each successive print run can begin with more accurate constants stored in the computer.

An alternative method that can be used to generate actuating signals would be to load the constants as a negative number in a counter register to which is applied the pulse output of the encoder. Each register is then counted up to zero. Several alternative embodiments could be designed to achieve a similar result. It is only necessary that the printing commence at a predetermined spatial interval after start up and continue at predetermined intervals thereafter.

In an embodiment in which the resolution of the printing is 300 dots per inch ("dpi"), the design of the precision encoder is such that 9 pulses are generated from one dot row to the next. Accordingly, a selected number, 9, is generated and added to increment the registers. After the counter reaches the incremented number, a new actuating impulse is generated and the register is incremented again. Each ninth pulse establishes the beginning of a "time window" during which printing should be initiated for each dot row.

This result can also be implemented by using a modulo-9 counter once the printing is initiated. Alternatively, the counting registers can be incremented by a count of 9 (minus or plus, respectively) and each zero condition can signal a new print line.

For those incremental areas which are to be printed with more than one color, it is important that the electrodes of the print head for each of the selected colors be heated such that the colored wax liquefies and is deposited directly over the wax dot applied by a prior print head. The magnitude and duration of the electrical impulse to the printing electrode determines the size of the dot of wax which is transferred to the web medium and the precise location that the dot will occupy.

When printing in many colors, the perceived color of any given area is the function of the primary colors (with black) that are employed and the relative size of each area of color that is deposited in the given area. As with the pointillists or with "half tone" or other engraved printing plates, the shade and hue of any color that is created is a function of the density and size of each color component. Using two dots of the same size but different colors will be perceived differently than two dots of the same different colors but of different size. In the preferred embodiment, the printer generates uniform sized dots.

In a preferred mechanization of the present invention, a digital computer is extensively utilized to store and retrieve data files corresponding to documents to be printed. The computer also provides necessary operating controls to the components of the web drive system. The computer determines when and what to load into the various printer buffers and registers that actually supply the print signals to the individual thermal electrodes of the several print heads that are required for a full color printer.

For example, a full color document to be printed is initially stored in a printer memory that has as many memory locations as there are "dots" in the entire document. In one embodiment, there is a "word" in each memory location. For a document that will be 8"×10", the memory must have at least 2,400 columns and 3,000 rows to print a document at 300 dpi. Each stored word contains a predetermined number of bits in four groups, one for each of the colors to be printed.

In the present example, it has been found preferable to follow the lead of conventional 4-color platen printers which utilize three primary colors and black. In the printer chosen for the present example, the colors selected, in print order are yellow ("y"), magenta ("m"), cyan ("c") and black ("k"). For ease in explanation, components which are particular to each color will be subscripted by the appropriate letter, y, m, c, or k.

Each of the printing heads has associated with it a register which stores a portion of the document. It has been found convenient to store approximately an inch, or 400 lines of the document in the first or yellow register $R_y$. The second or magenta register $R_m$ stores the same amount of data plus an amount of data which corresponds to the nominal distance between the print heads. Here that distance is about 4" or 1,200 lines for a total of 1,600 lines of magenta color data in the magenta register $R_m$.

Similarly, the cyan register $R_c$ stores the 400 lines plus the 1,200 lines representing the distance between yellow and magenta and an additional 1,200 lines for the distance between the magenta head and the cyan head. As can be expected, the black register $R_k$ stores a number of lines equal to that stored in the $R_c$ register plus 1,200 lines representing the distance from the cyan head to the black head.

The individual printing heads which are commercially available from suppliers provide both storage and addressing capabilities so that there is a communication protocol that is dictated by the head selected for printing.

As noted earlier, the position encoder causes the generation of periodic printing impulses which are applied to the heads as a strobe pulse opening a time window during which specific energy pulses of preselected magnitude and duration are applied to the individual electrodes that are to be heated to a temperature sufficient to melt wax from the ribbon and to transfer the wax to the web medium.

A problem of hysteresis is presented in a thermal printing process. While the temperature of a printing electrode or nib can be quickly raised by the application of an energy pulse, a longer time is required for the nib to cool, generally along an exponential curve that is affected by the ambient temperature of the print head. At web or media rates of 3 to 6 ips, the nibs require from 5 to 10 print rows or lines to cool to the ambient print head temperature. The rate of cooling can be increased by providing a refrigerated heat sink, such as may be achieved using thermal junction material which has been commercially available for some time.

Because of the way in which the nibs cool down, a nib that has printed in the next prior line (a "hot" nib) will be "warmer" than a nib which has not printed in the prior interval. Further, a nib which has not printed for two prior intervals will be even cooler. Less important, but important nonetheless is the status of the nibs adjacent a subject nib. If the neighboring nibs have printed in the prior line and are hot nibs, thermal conductivity will transfer some of their heat to the subject nib.

The resistance of the individual nib circuits will also have an impact on the ability of the nib to melt the proper quantity of wax at the proper time. Further, each color wax ribbon has its own characteristics including temperature of melting and fluid flow properties. These, too, affect the magnitude and duration of an applied energy pulse and when such a pulse should start and terminate, relative to the passage of the medium over the nib.

Several approaches have been suggested to meet these conditions. One suggestion provides a plurality of thermal energy pulses of varying duration depending on whether a nib is "cold", "warm" or "hot". Another suggestion requires that all applied thermal energy pulses terminate at the same time. Yet a different suggestion requires that all nibs be kept at an elevated resting temperature just below that needed for printing by supplying "maintenance" pulses during every interval that a nib is not actually printing.

An alternative suggestion has a cold nib energized during the prior print interval. By the time that printing should commence, the temperature will have been elevated sufficiently so that a pulse of lesser duration will be adequate for printing. Yet another scheme utilizes binary weighted time intervals for supplying energy pulses to each nib where the longest interval may be one hundred twenty eight times the shortest interval and any particular interval can have a duration of from 4 to 512 microseconds. These suggestions have been mechanized under computer software control in a preferred embodiment of the invention.

All of these suggestions acquire greater importance as printing speeds increase. For example, an increase in print speed from 3 to 6 inches per second halves the time available for nib cool down and interval during which printing takes place. However, the rate at which the wax melts or flows is generally immutable and independent of the print speed. Also, as printing speeds increase, it may become necessary to anticipate and commence printing "early".

In printing text or full color documents where there are areas of solid color or black, it is necessary that the individual dots be substantially square, fully occupying the incremental area allocated to the dot. This is partially accomplished by the width of the individual nibs, which when sufficiently heated, can melt a wax area greater than the width of the nib. The duration and magnitude of the energy impulse determines the "length" of the dot to be deposited. However, the manufacturer has recommended that a nib duty cycle should not be greater than 50% over several print lines, which would contraindicate a continuous energy level at the nibs for printing solid areas based on "cold" nib temperatures.

However, when printing areas that are to be solid colors, it may be more desirable to print dots that are slightly oversized so that should a dot be undersize, there will be no appearance of "borders" around such individual dots. By examining the contents of a document, areas of solid color can be anticipated and the energy impulses supplied to the printing electrodes can be increased so that the dots in the area of solid color can be slightly oversize to assure a smooth overlap.

For ease in discussing the invention and its various embodiments, some conventions have been adopted. The letter "T" has been used to represent temperature, the letter "t" has been used to represent time, the letter "N" has been used to designate printing nibs and the letter "$\pi$" has been used to represent pulses.

One plan that has been implemented permits a selection of one of "n" intervals where n has a value that can be at least 15. For each line of a given color, the print register will store a "1" where a mark is to be printed and a "0" if no mark is to be printed. A logic unit stores a number corresponding to the last line in which a mark was printed. This is implemented by using a counter which is reset to "1" by each stored "1" and which is incremented by "1" by each stored "0". The counter is limited to a count of n. Print pulses designated $\pi_1$ through $\pi_n$, are progressively longer.

It has been determined that it is preferable if the print pulses of all of the nibs end together. Accordingly, the print head is loaded in n sub intervals, each corresponding to a print pulse $\pi_1$ through $\pi_n$. The head storage cells corresponding to each nib which is to receive a $\pi_n$ pulse are loaded first, prior to the occurrence of the $\pi_n$ pulse. Next, the cells corresponding to the nibs which are to receive a $\pi_{n-a}$ pulse are loaded, just prior to the occurrence of the $\pi_{n-1}$ pulse. The cells to receive $\pi_{n-2}$ and $\pi_{n-3}$ pulses are then loaded and finally, the cells corresponding to the hot nibs and which are to receive a $\pi_1$ pulse are loaded last.

In this scheme, depending upon the implementation, each nib will receive either a continuous pulse lasting through the interval or a series of sequential pulses which will appear to be substantially continuous. An advantage of this procedure is that all nibs that have printed will, at the end of a print interval, be at the desired temperature at the same instant.

Another problem that must be addressed is one of non constant velocity. If velocity varies by more than a few per cent, the cool down time of the nibs will be affected and any regular variation in velocity will become noticeable as a variation in print density of the dot row or line. Since velocity information can be obtained from the encoder, an appropriate routine within the computer can adjust the length of the various strobe print pulses to accommodate the velocity changes.

In summary, determining the magnitude and duration of the electrical impulse that is to be applied to each of the electrodes to produce a colored dot of the desired size and placement, requires the use of algorithms that utilize functions of the prior history of an electrode and the history of electrodes on either side of that electrode, as well.

Other algorithms examine the velocity of the web to correct for velocity variations. Algorithms also consider the overall and regional temperatures of the print head, the characteristics of the web and the colored wax, and the resistance of each electrode in the printing head and even the contents of the as yet unprinted portion of the document file. Other significant parameters include the thermal transfer characteristics of each print head, its heat sink and the printing platen.

In one embodiment, the prior history of a particular electrode over a number of prior print cycles is combined with the history of the next adjacent electrodes for a fewer number of prior cycles and with the history of more remote adjacent electrodes for even fewer prior cycles.

Because the printing process requires a substantially constant voltage across each of the printing electrodes and because the current requirements are a function of the magnitude and duration of the printing impulse that is applied to each of the electrodes, it has been found useful to create, in the computer memory, an estimate of the instantaneous current needs of each of a series of subregions of the print head.

This can be done by examining the document file, or, for that matter, printing buffer registers to note which electrodes will require current and how much current is to be supplied to all of the electrodes. One solution is to calculate a "weighting" for each electrode and to modify the duration of the pulse applied to that electrode to be sure that adequate power is supplied for the desired result.

Another approach is to subdivide a printing head into several regions and determine from the total available energy, the energy available in the region and the desired energy to be supplied to each electrode. Yet another approach that could be employed if it appears that insufficient current will be available for a particular line, is to "preheat" some electrodes in earlier lines to reduce the duration and magnitude of the printing impulses sufficient to deposit dots for those electrodes.

For better control of dot size and shape, it may be desired to maintain each electrode at a "resting" temperature which may be fairly close to the temperature at which the wax melts. This enables the use of shorter printing pulses of lesser magnitude which, in turn, enables a closer control of the time that the wax actually melts and transfers to the web medium. Such timing is essential if accurate registration of the colored dots is to be achieved.

Another technique to assure reliable printing at higher speeds would be to initiate the provision of printing current to "cold" electrodes in advance of the time that the "warmer" electrodes are powered. Because the interval between such printing impulses is already subdivided by the position encoder, printing for a particular electrode could be commenced during a prior interval by a count less than 9 or, depending upon the web velocity, may commence during the printing of an earlier line.

It is therefore an object of the invention to provide circuits and systems to superimpose colored dots to form other colors on a moving web.

It is an additional object of invention to provide a thermal printer whose printing electrodes are individually energized by impulses whose magnitude and duration depend upon the nature of the image to be printed.

It is an additional object of invention to provide a thermal printer whose printing electrodes are individually energized by impulses whose magnitude and duration depend upon the velocity of the medium.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DESCRIPTION OF DRAWINGS

FIG. 5, including FIGS. 5a–5d, charts the temperature vs. time of a typical nib absent a hysteresis correction;

FIG. 6 including

FIG. 12 which includes

FIG. 14 which includes

DESCRIPTION OF THE PREFERRED EMBODIMENTS

Figure 1:
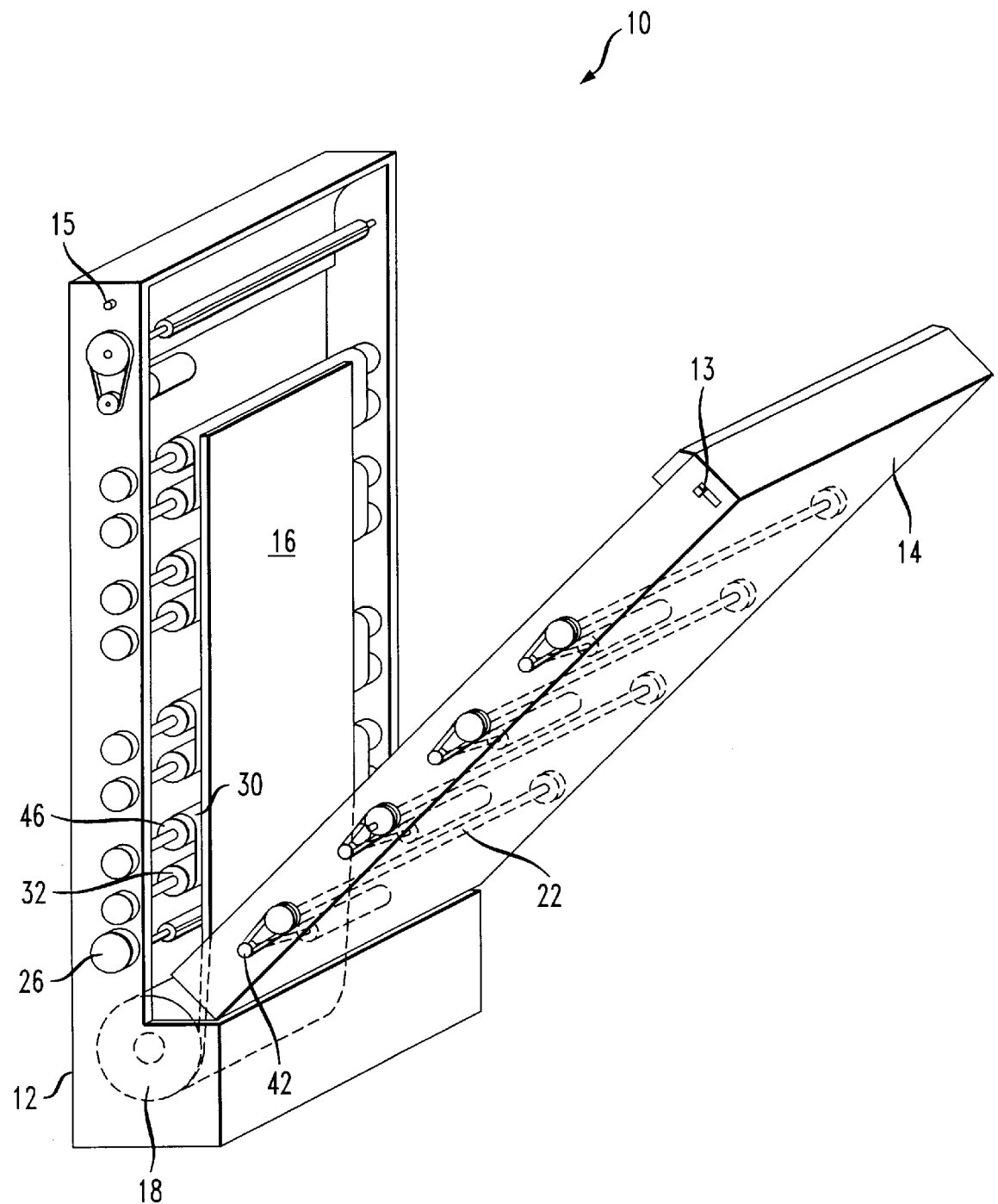
FIG. 1 is idealized perspective view of a color thermal printer according to the present invention.

Turning first to FIG. 1. there is shown a four color thermal printer which has been described in detail in the copending application of Charles V. Tolle, Mark A. Hitz, Robert P. Johnson and Steven C. Szabo, entitled "HIGH SPEED MEDIA MANAGEMENT DEVICE", filed concurrently herewith under Serial No. **, and assigned to the assignee of the present invention. So much of that application that describes FIG. 1 has been incorporated hereinbelow.

FIG. 1 illustrates a high speed thermal printer 10 in which the present invention can be employed. The printer 10 includes a frame 12 to which is hinged a door 14. A medium or web 16 is provided to receive images and is preferably paper.

A supply source 18, can either be a spool of paper or a z-folded stack is located in the bottom portion of the frame 12. The web 16 spans the entire length of the frame 12, (which is configured to be vertical) and is placed between the frame 12 which contains most of the operating components and the door 14 which contains cooperating elements. A latch 13 on the side of the door 14 hooks onto a complementary post 15 on the frame 12, to lock the two portions together in close and stable proximity.

Figure 2:
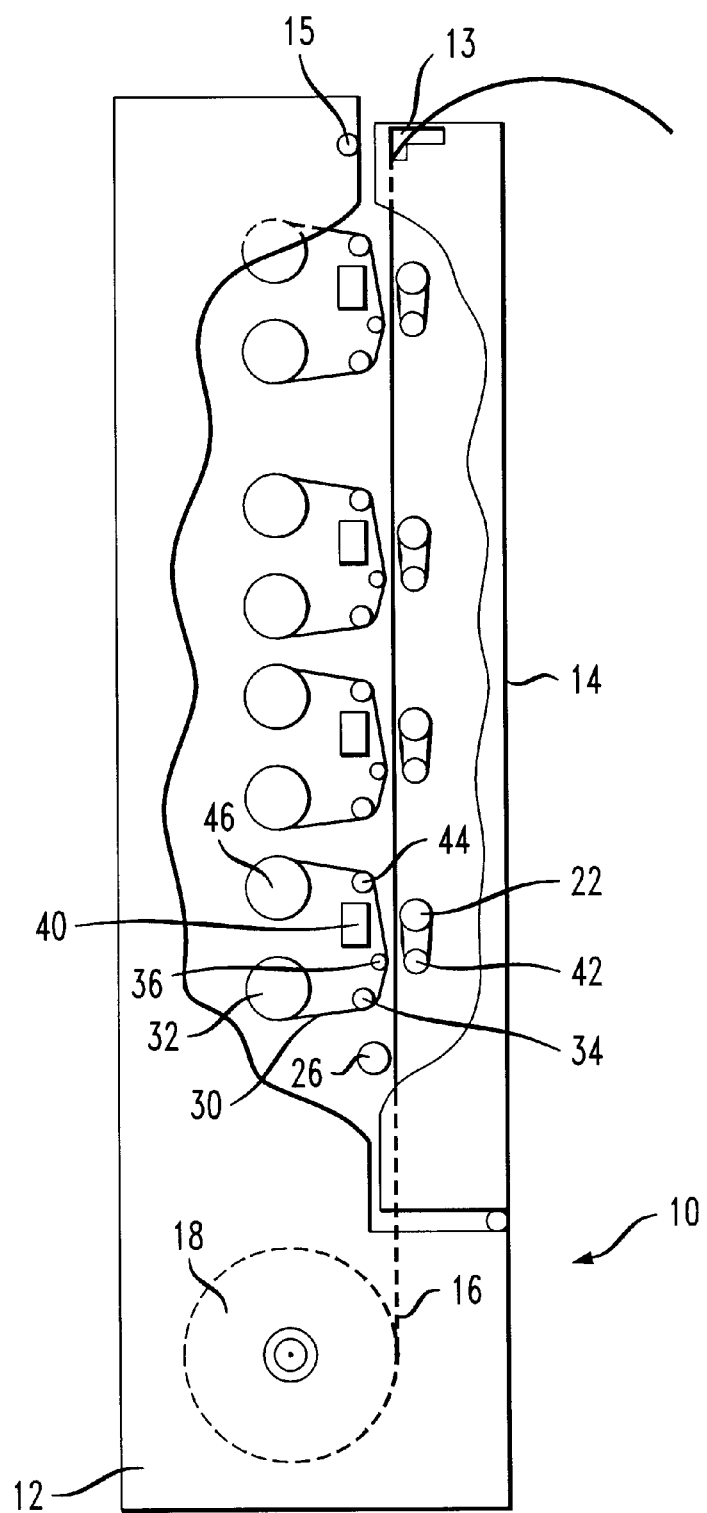
FIG. 2 is a diagram of operational elements of a printer according to a preferred embodiment of the invention.

FIG. 2 is a partially broken away side view of the device of FIG. 1 and shows the some of the components that comprise the printer 10. As shown in the Figure, the web 16 encounters an encoder element 26 that is in non slip contact with the web and signals each increment of web 16 travelling through the system. In a preferred embodiment designed to operate at a print density of 300 dpi, the encoder generates 4,000 pulses per revolution or 9 pulses from the start of one dot row to the start of the next dot row. Each pulse signals the passage of $3.7 \times 10^{-4}$ inches of web 16 or 0.37 mils.

A driving roller 22 acts a "tractor" for the web 16 and pulls the web 16 together with a waxed colored ribbon 30 through a first print station which includes a braked ribbon supply roll 32 which supplies the ribbon 30, idler rollers 34, 36 which direct the ribbon 30 into contact with the web 16. The driving roller 22 holds the web 16 and ribbon 30 into intimate contact with a print head 40 which includes a plurality of printing electrodes or nibs. In one embodiment, a commercially available thermal print head that is intended to print at a density of 300 dpi is supplied with over 3,500 individually addressed nibs.

As the web 16 and ribbon 30 leave the print head 40, the ribbon 30 is separated from the web 16 by a separator idler 44 which directs the used ribbon 30 to a take up reel 46 that is powered to avoid slack. The web 16 continues to a second print station that includes substantially all of the elements of the first print station. In order to print in the three primary colors and black, four print stations are provided, one for each color.

In a preferred embodiment, the printer 10 is arranged so that the first print station prints in yellow, the second in magenta, the third in cyan and the fourth in black. Accordingly, where the discussion involves substantially similar elements from different print stations, the subscripts "y", "m", "c" and "k" will be used for "yellow", "magenta", "cyan" and "black", respectively.

Figure 3:
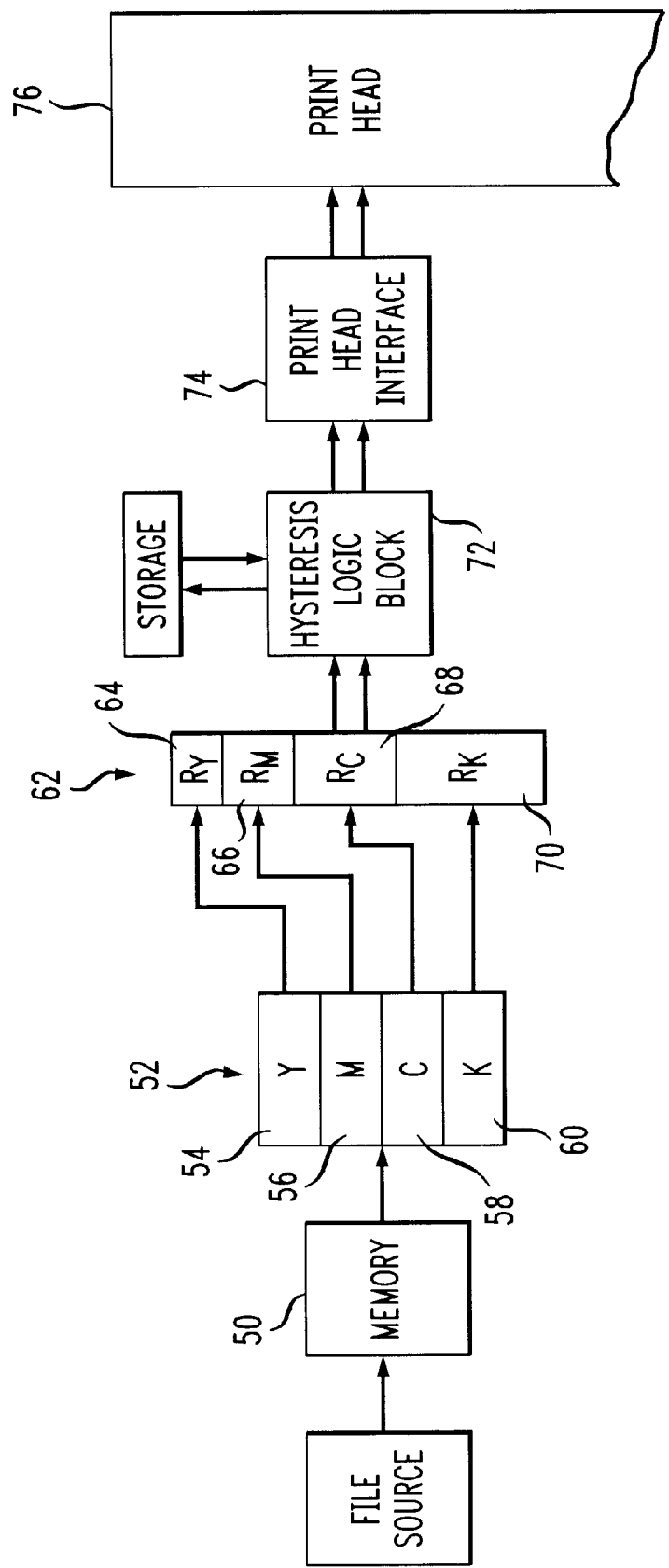
FIG. 3 is a block diagram indicating data flow in the printer of the present invention.

FIG. 3 is a block diagram indicating data flow in the printer 10. Data, representing a document to be printed, can be stored in a hard disk memory 50 which should have a capacity in excess of 1.0 gigabytes (1 billion bytes). In the stored data files, the document is arranged serially, dot by dot within a line and line by line throughout the document. A typical 8 bit byte contains information for two dots and includes information for each of the colors that will be used in creating the dot. For example, a typical 8 bit format would be arranged by color and by nib.

A color separation block 52 divides the information to four random access memory areas $M_y$ 54, $M_m$ 56, $M_c$ 58, and $M_k$ 60, each corresponding to one of the colors. Each of the random access memory areas has addresses for all of the dots in a line and for all of the lines in the document. If a dot is to be printed, a "1" is stored at the corresponding dot and line location while a "0" is stored if nothing is to be printed at that site.

A separate image memory 62 is provided which is allocated to each of the colors and the corresponding print head for that color. Approximately six inches of data or 1,750 lines can be stored in the yellow register $R_y$ 64. The magenta register $R_m$ 66 holds 1,750 lines plus the spacing between the yellow and magenta print heads or 3,250 lines. Similarly, the cyan register $R_c$ 68 holds 1,750 lines plus the distance from yellow head to the cyan print head (3,000) for a total of 4,750 lines. The black register $R_k$ 70 stores 1,750 lines plus the distance from the yellow to the black print head (4,500) for a total of 6,250 lines.

A hysteresis logic block 72 provides gating information to enable the print heads to be loaded with information for the print operation. In one embodiment, pulses of graduated duration strobe the energy pulses that are applied to the print heads. Hysteresis circuits within the hysteresis block 72 determine which of "n" pulses, $\pi_1$ to $\pi_n$, are required. In one embodiment, n was chosen to be 5. Those data bits intended for a printing nib to which a $\pi_5$ pulse is to be applied are loaded during a first sub interval. Data to be printed by a $\pi_4$ pulse are loaded next, followed by data for the $\pi_3$, $\pi_2$ and $\pi_1$ pulses.

Because of the particular circuits provided by the head manufacturer, data for two lines is loaded into the print heads in groups whose size is determined by the print head requirements. All information necessary for the printing of a line is applied through the hysteresis logic block 72 to a print head interface block 74 which is, in turn, connected to a print head 76.

Figure 4:
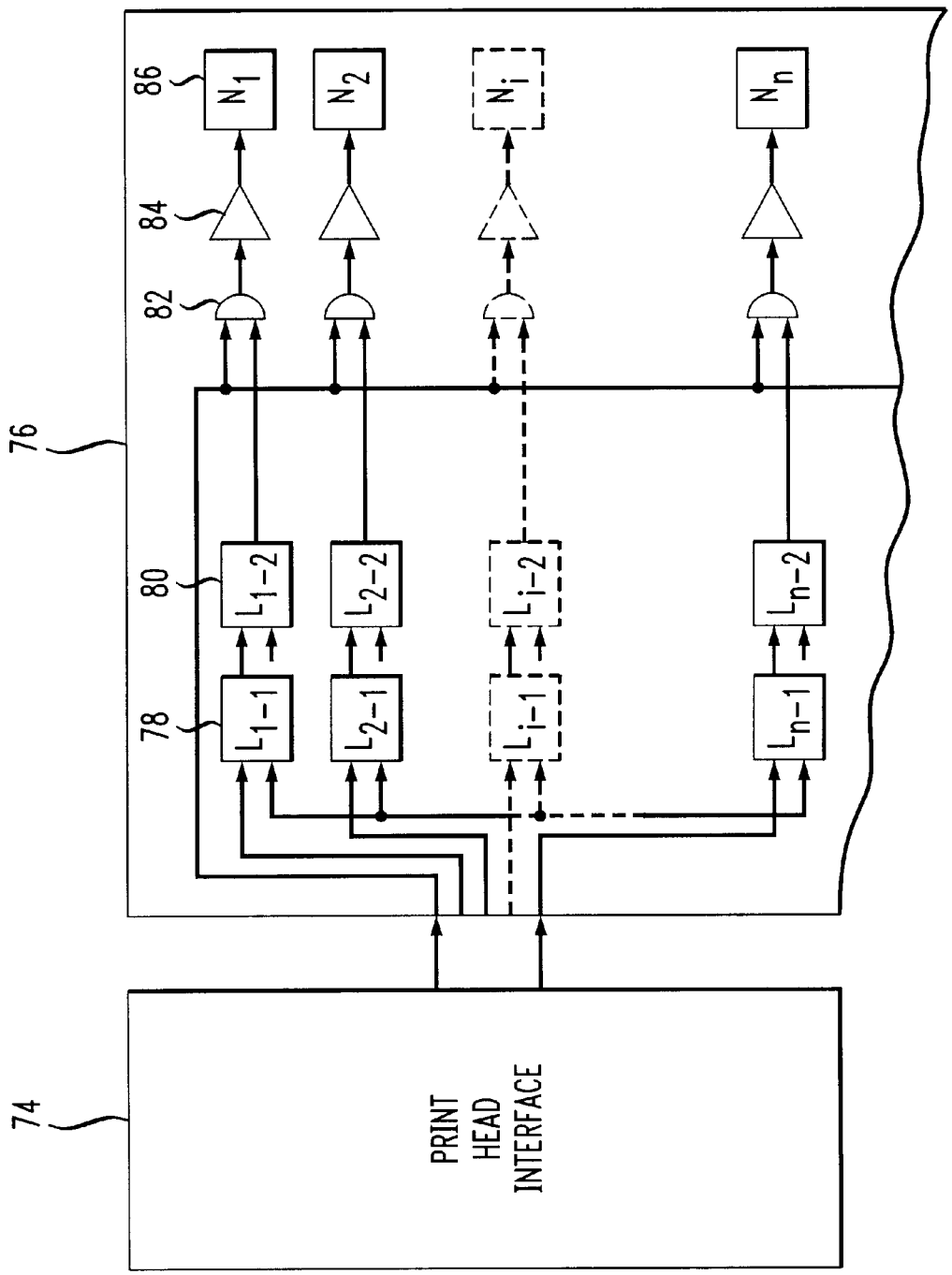
FIG. 4 is a block diagram of particular circuits in the printer of the present invention.

The particular circuits in the printer described herein are set forth in the block diagram of FIG. 4. The print head 76 includes for each nib a pair of serially connected latches 78, 80 whose output is applied to one input of a two input "and" gate 82. The other "and" gate input is the print strobe pulses $\pi_n$ to $\pi_1$ in sequential order, supplied by the print head interface 74. In the present example, n is equal to 5. The "and" gate 82 output is applied to a driver circuit 84 whose output energizes an individual print nib 86. It will be understood that for each of the over 3,000 nibs 86 there is a latch pair, an "and" gate and a driver circuit. With large scale integrated circuits, this need not be a concern.

If the hysteresis circuit determines that nib $N_i$ is to print and that it is "very cold", in this embodiment, a $\pi_5$ pulse will be specified for that line. The "1" representing a printed dot for nib $N_i$ is loaded first, at the earliest opportunity. For nibs that are warmer, the "1" representing a printed dot will be loaded later in the cycle so that after each nib that is to print has been energized, all energizing impulses will cease at the same time.

The problems of the effects of hysteresis can be explained in conjunction with FIGS. 5 and 6. Both figures show a temperature vs. time curve for a printing nib and, aligned along the same time base are graphs representing the timing of the energizing printing pulses, a desired output of melted wax vs. time, and the actual output of melted wax vs. time.

Turning first to FIG. 5a, the temperature vs. time chart of a typical nib, there are 3 temperature points that represent constraints. A first point is $T_{max}$ which represents the highest temperature that a nib can reach without being destroyed. A second point is the temperature at which the wax on the ribbon will melt and transfer to the web, $T_{melt}$. A third temperature is $T_{room}$ representing the ambient temperature in the environment of operation.

When a nib is energized, its temperature rises to sharply to $T_{melt}$. As wax melts, the temperature rises less rapidly as the melting of additional wax absorbs heat from the nib. At some predetermined point in time, the pulse is terminated and the temperature drops exponentially toward room temperature, $T_{room}$. The predetermined point is selected to enable the wax to continue melting until the end of the printing interval.

If a dot is to be printed on the next line, the next energizing pulse will be applied to the nib. However, since, as shown, the nib was already above the wax melting temperature $T_{melt}$, the nib rises to a higher temperature with an energizing impulse of the same duration. Since the time to cool has not been changed, at the end of the interval, the nib will still be at a temperature well above the melting temperature $T_{melt}$. If now a third dot is to be printed, the next energizing pulse is applied, driving the nib to an even higher temperature. So long as the image to be printed requires that a sequence of dots be printed to create a solid line of dots, the fact that the nib never cools to a temperature below the melting temperature, $T_{melt}$ is not noticeable in the printed image.

It is when no dot is to be printed following a series of printed dots that the problem arises. As can be seen, four dots have been printed to be followed by no dot. However, at the conclusion of the printing interval for the fourth dot, the temperature to which the nib has cooled is still above the melting temperature $T_{melt}$ and remains above that temperature for a significant interval after being de-energized. The desired output graph shows that ideally, each dot should be discrete with very little space between adjacent dots. Unfortunately, the normal consequence of a series of dots is a fractional dot where there should be a clear area. This is indicated by the cross hatched area in the graph of FIG. 5d.

Figures 6A, 6B, 6C, 6D:
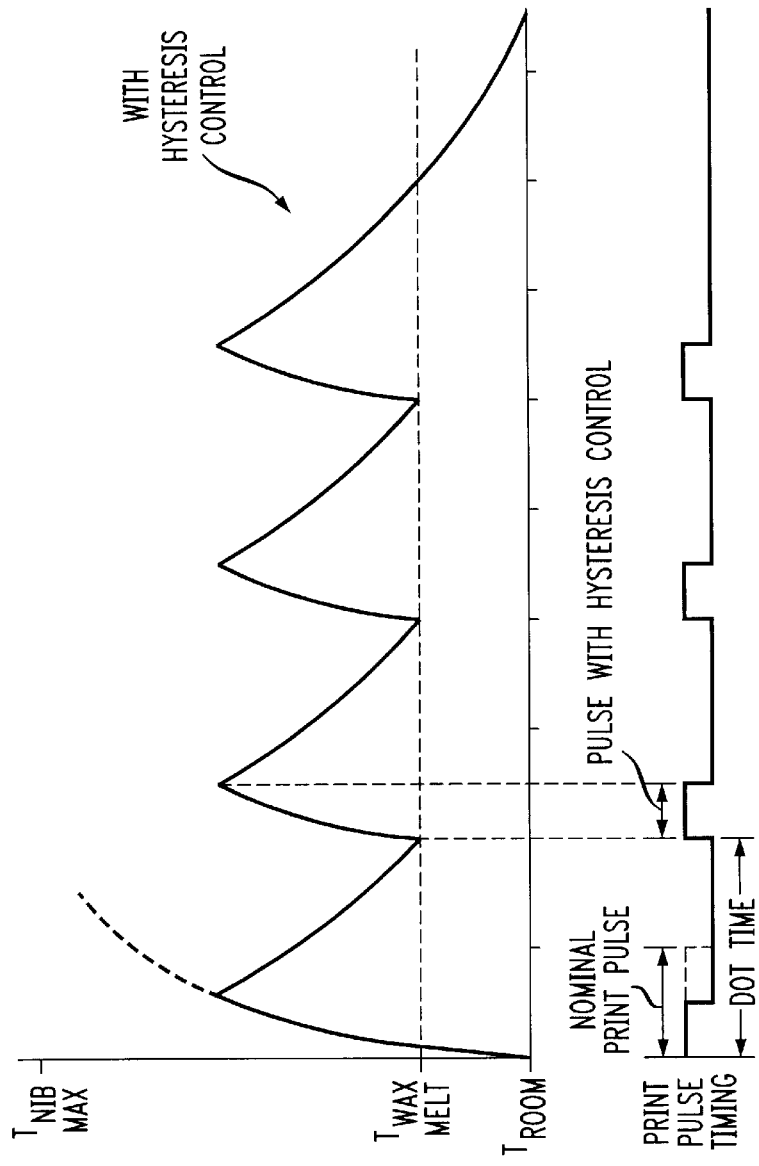
FIGS. 6a–6d, shows similar charts reflecting the influence of hysteresis control.

Turning now to FIG. 6, including FIGS. 6a–6d, the same graphs are provided showing the influence of hysteresis control. In FIG. 6a, which shows nib temperature with time, the application of printing impulses causes the nib temperature to rise above the wax melting temperature $T_{melt}$. However, as shown in FIG. 6b, the printing impulse is of shorter duration and uses less of the available time. As a result, the nib reaches a lower peak temperature, which is one which permits the nib to cool to below the wax melting temperature $T_{melt}$ by the end of the printing period.

The successive printing impulses are of the same or shorter duration so that the nib reaches its highest temperature at a time in the print period that allows the nib to cool by the end of the print period. As a result, the next or fifth interval, which should not print, the nib has cooled to a point beneath the melting temperature $T_{melt}$ so that no inadvertent printing takes place.

Comparing the Desired Output (FIG. 6c) with the Actual Output (FIG. 6d) it will be seen that each wax dot is discrete although the spacing between successive dots is somewhat less than was desired.

As shown in FIG. 6b, the control of hysteresis is accomplished by adjusting the duration of the printing impulse while leaving the magnitude of the impulse unaffected. In alternative approaches, the duration might be fixed and the magnitude variable or both duration and magnitude might be adjusted to allow for a nib temperature at the beginning of a print interval that may vary from a predetermined temperature.

One approach that improves the quality of the printing when correcting for hysteresis by varying the duration of a printing impulse is to start longer impulses earlier in the interval and shorter pulses later in the interval so that for all of the nibs, all energizing impulses terminate together, whether or not at the end of the interval. One approach, which has been mechanized in the preferred embodiment and which can be implemented in the circuits of FIG. 4 is graphically illustrated in FIG. 7.

Figure 7:
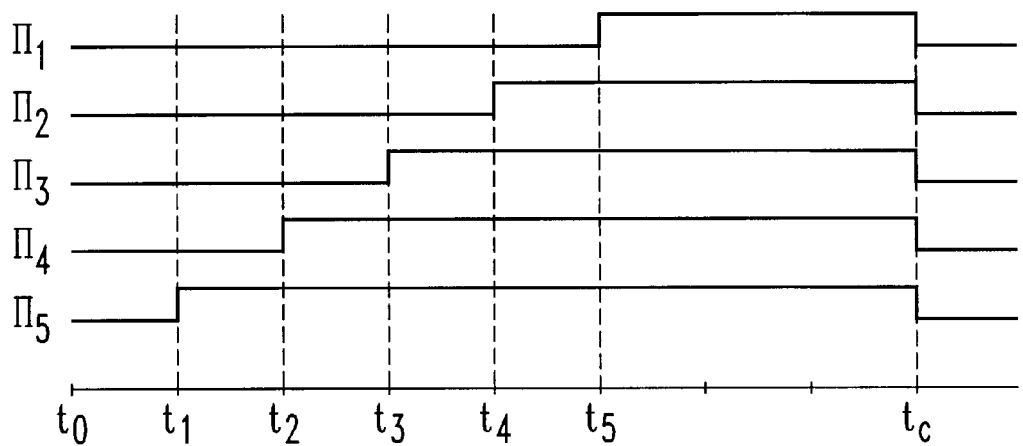
FIG. 7 illustrates the relationship among the several intervals $\pi_1$–$\pi_5$.

According to this mechanization, the hysteresis circuits determine for a particular line $L_i$ the duration of impulse necessary to print a dot, considering the estimated temperature of the nib at the time the dot is to be printed. A series of periods $\pi_1-\pi_n$ have increasingly greater duration. In a particular embodiment, n has been made equal to 5. In this embodiment, the periods can be created by enabling a circuit with five successive clock pulses which can be identified as $t_1-t_n$ and continuing with a predetermined number of additional clock pulses until a final pulse $t_c$. For example, a period $\pi_5$ is created by enabling all five successive clock pulses $t_1-t_5$ until $t_c$. A shorter interval, $\pi_3$ is created by enabling clock pulses $t_3$ to $t_5$ until $t_c$. The shortest interval, $\pi_1$ is created by enabling clock pulse $t_5$ until $t_c$. This is illustrated by the chart of FIG. 7 which shows the pulses of increasingly longer duration.

Figure 7A:
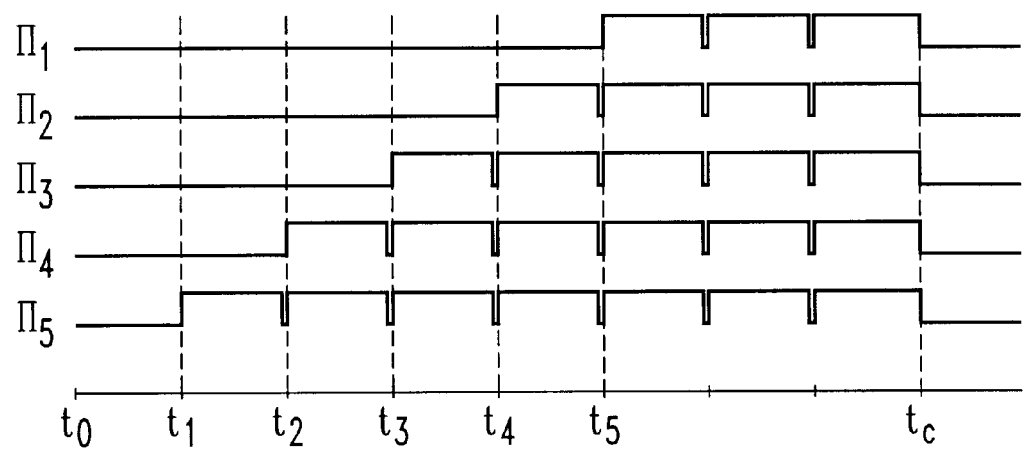
FIG. 7a shows the generation of a printing interval from several clock pulses.

In an equivalent application, the individual clock pulses could be stretched to extend over the clock interval and be applied to the nibs as a series of pulses whose net effect would be equivalent to a single pulse extending over the same number of clock pulse intervals. Such an embodiment is illustrated in FIG. 7a in which each of the $\pi$ intervals is shown being comprised of a series of clock pulses. For example, the interval $\Pi_3$ is comprised of clock pulses $t_3$, $t_4$, $t_5$, and the subsequent clock pulses until $t_c$.

In determining the effect of this printing impulse upon subsequent printing impulses, the duration of the printing impulse is comprised of the sum of the durations of the individual clock pulses which are applied to constitute the interval $\Pi_i$.

Alternatively, a set of individual pulse generators could be provided, each capable of providing an impulse of the desired duration. Appropriate gating and switching circuits could be interconnected so that each nib receives a printing pulse of proper duration, as directed by the hysteresis circuits. Each of the printing pulses can be initiated at an appropriately staggered start time so that all pulses terminate together.

Turning to FIG. 4, to implement one hysteresis scheme, the print head 76 is loaded with data "n" times per print line to accommodate print pulses $\pi_1-\pi_n$. For n =5, the first data to be loaded is transferred into the first latch 78 from the print head interface circuit 74 at time $t_0$. It is to be understood that there are as many first latches 78 as there are printing nibs 86 in the print head 76. This initial data has been determined by the hysteresis circuits to require the longest printing interval. The hysteresis circuit, when recognizing the need for a $\pi_5$ interval, sends a train of "1" signals during each of the data loading pulses $t_0-t_4$.

The next data, representing a print command requiring a pulse $\pi_4$ as well as the "1's" for the $\pi_5$ pulses is loaded into the first latch 78 at the time $t_1$, and, at the same time, the contents of the first latch 78 are transferred to the second latch 80. A print strobe pulse gates the contents of the second latch 80 into the print nib which is energized so long as there is a "1" stored in the second latch 80.

At time $t_2$, the $\pi_3$ data as well as the ones for the $\pi_5$ and $\pi_4$ T pulses is transferred into the first latches 78 and the contents of the first latches 78 are transferred into the second latches 80. The print strobe pulse then energizes all nibs 86 whose second latch 80 is storing a "1". The process continues until all data constituting the printed line has been loaded into the latches and the corresponding nibs have been energized.

Figure 8:
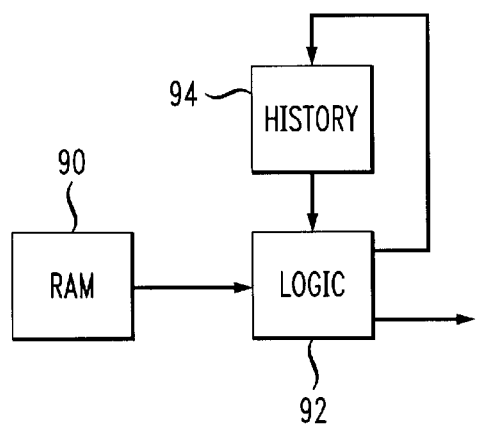
FIG. 8 is a block diagram of a hysteresis control circuit based on the history of a nib.

In FIG. 8, a logic circuit to mechanize one approach which utilizes the history of a nib to determine the appropriate energizing interval is illustrated. In FIG. 8, a portion of a Random Access Memory (RAM) 90 holds the next single line of information to be printed. A logic circuit 92 is provided for each nib and receives, as an additional input, a number having a value ranging from 1–n, as determined by a n-line history module 94. In this embodiment, n=5. The output of the logic circuit 92 is fed back to the history module 94 which operates under a set of rules. A second output of the logic module is a number having a binary value ranging from 0 to n, which, in this example is 5.

If any number is generated by the logic circuit 92, the entire contents of the history module 94 are reset to a value of 1 and succeeding, consecutive print commands will have a value of 1, commanding the shortest printing interval, $\pi_1$, However, if there is no print command (corresponding to a "1" in the RAM 90, then each line stored in the history module 94 is incremented by "1". Depending upon the number of lines until the next print command, the output of the logic circuit 92 will progressively increase from 2–5, 5 being the highest number that can be stored on any line within the history module 94 in the embodiment being described.

It will be seen that if there is only 1 line between successive print commands, the number 2 will be applied and a printing pulse $\pi_2$ will be generated. Similarly, 2, 3, and 4 line intervals until the next print command will result in the numbers 3, 4, and 5, respectively, corresponding to printing pulses $\pi_3$, $\pi_4$ and $\pi_5$, respectively.

Figure 9:
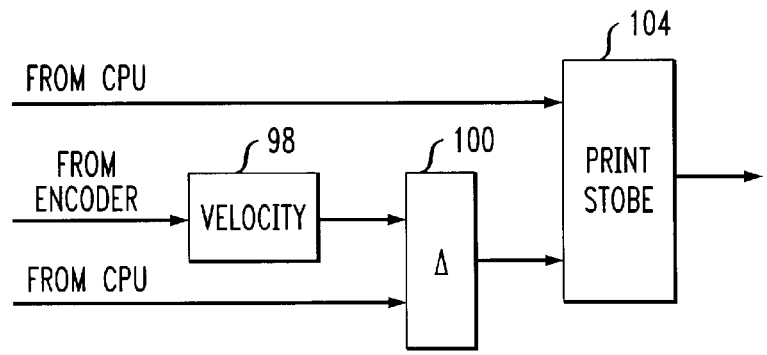
FIG. 9 is a block diagram of a hysteresis control circuit based on the velocity of the web.

In FIG. 9, there is shown circuitry that corrects for variations in the velocity of the web. If the web velocity varies, the time intervals for the various printing impulses will vary, resulting in printing slightly darker or lighter than the optimum print density as a result of lesser or greater velocity, respectively, than the velocity for which the printing intervals have been designed. Accordingly, if the instantaneous velocity is different than the desired velocity, than all of the printing impulses must modified in accordance with the formula:

K×print impulse, where $$K = \frac{\text{actual velocity}}{\text{desired velocity}}.$$

In FIG. 9, the encoder 24 (from FIGS. 1, 2) supplied pulses to a velocity circuit 98 which applies a signal representing instantaneous velocity to the dividend input of a divider circuit 100 which receives, as a divisor input, a signal representing the desired velocity from the CPU. The output is then applied to an impulse duration correcting circuit 104 which generates printing pulses based upon timing information received from the CPU clock.

In alternative embodiments, the correction signal input to the correcting input 104 could be derived from a circuit which subtracts the actual velocity from the desired velocity. The correction would then be a function of the difference which, if positive, would increase the duration of the printing impulses and, if negative, would shorten the duration of the printing impulses.

Another significant factor in correcting for hysteresis, apart from the effect of the history of each nib, as explained above, would be the effect of the history of the nibs adjacent the nib in question. These adjacent nibs are considered "neighbors" and their history will have an effect, especially if they have been printing while the nib in question has been quiescent. The heat of a neighbor will, through conductivity, elevate the temperature of a nib, and if the neighbors are printing, the nib between the neighbors will remain warm, even though not printing. Therefore, to rely solely upon the history of the nib would be misleading. Where a hysteresis circuit might require a $\pi_5$ interval, because the neighbors have been keeping the nib warm, a $\pi_3$ or even a $\pi_2$ pulse might be sufficient for printing.

Figure 10:
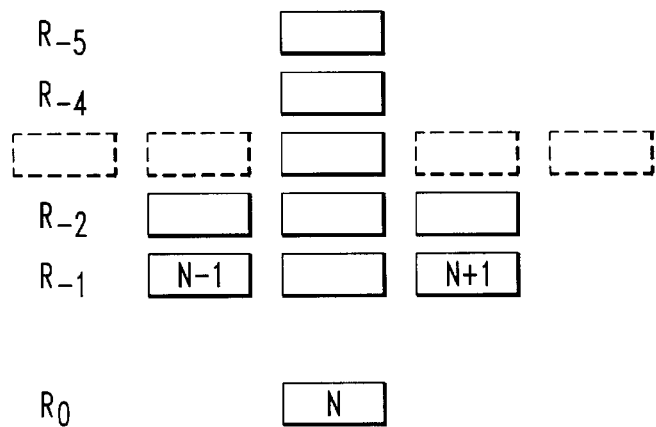
FIG. 10 is idealized diagram of the history of a nib and its neighbors.

Referring to FIG. 10, there is shown in a crude diagrammatic form, the factors that could be considered in a hysteresis algorithm that included the history of neighbors as it modifies the effect of the history of a nib in question $N_0$. In FIG. 10, the nibs to the right of $N_0$ have negative subscripts and the nibs to the left have positive subscripts. The rows which have already been printed are represented by negative subscripts in ascending order with age. The present row to be printed can be designated $R_0$, the prior row is $R_{-1}$ and the next prior row is $R_{-2}$.

The energy required to print at nib $N_i$ is a function of the history of nib $N_i$ expressed as $f[(N_i, R_{-1}), (N_i, R_{-2}), \ldots (N_i, R_{-n})]$. As a practical matter, n=5 has provided useful results and it may be that "older" inputs might be of only marginal value. Because the heat of the neighboring nibs is a factor to be reckoned with, $f[(N_{i-1}, R_{-1}), (N_{i+1}, R_{-1}) (N_{i-1}, R_{-2}), (N_{-1}, R_{-2}), (N_{i+1}, R_{-3}), \ldots (N_{i-1}, R_{-n}), (N_{i+1}, R_{-n})]$ must be considered, as well.

Figures 11, 12A:
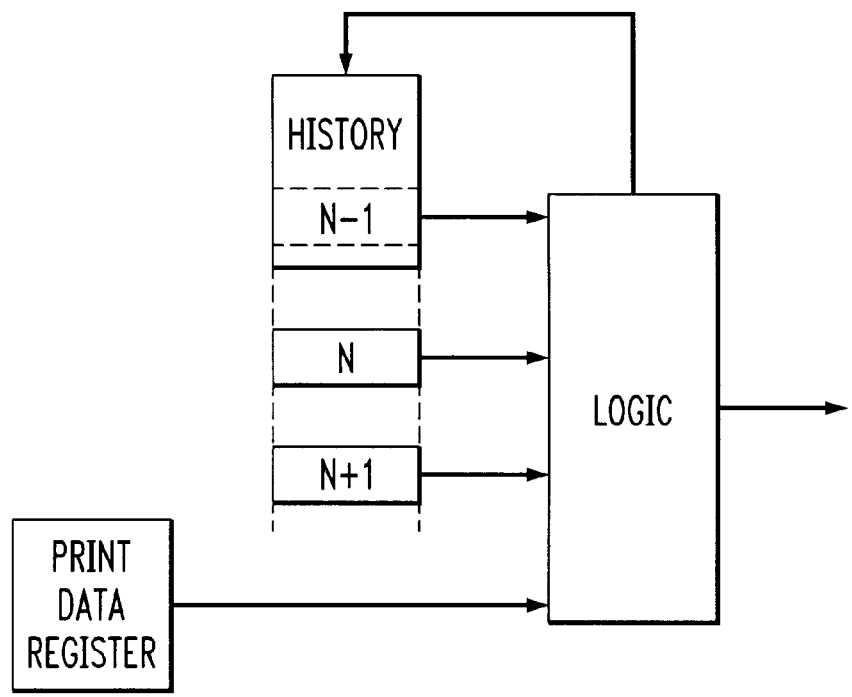
FIG. 11 is a block diagram of a hysteresis control circuit based on the history of a nib and its neighbors.
FIGS. 12a and 12b is a map of involved nibs and a block diagram of a hysteresis control circuit to control image density based on the past and future history of a nib and its neighbors.

Turning to FIG. 11, there is shown a diagram of a suitable hysteresis circuit to similar to that of FIG. 8, which utilizes the history of neighbors in generating a control signal to determine the duration of the printing impulse. A print data register 110 applies signals for each of the nibs to a logic circuit 112. For each row or line, a "1" represents a printed dot and a "0" represents the absence of a dot. As the information from the data register 110 is supplied to the logic circuit 112, a history block provides for each nib a number signal representing the number of lines since the last print signal was sent to that nib, modified by a weighted number representing the activity of the neighbors in a preselected number of prior lines.

In one embodiment, only activity of the neighbors for the prior line was considered and only the next adjacent neighbor on either side was considered. Further, the contribution of the neighbor was weighted by a factor of 0.25 based on the assumption that half of the heat would flow to the nib under consideration and that only half of the possible contribution would be conducted to the nib in the time between print rows. As each nib writes, its history is rewritten to the minimum value. For each line that is not written, the numbers in history are incremented by "1". In this mechanization, the history number for each nib is reduced by one fourth of the history number of each of the next adjacent nibs.

An alternate approach would be to maintain a record of estimated nib temperature which is modified by a suitably weighted contribution of the temperature of the next adjacent neighbors. In this modification, the following rules would apply:

1. a. If nib $N_i$ prints, then the temperature T is set to $T_{max}$;
   b. If nib $N_i$ does not print, then the temperature T=T×K, where K is a cooling percentage.
2. a. If either neighbor prints, then T=T+v. where v=the heat contribution from the printing neighbor;
   b. If both neighbors print, then T=T+2v.

One of the goals of the hysteresis circuits and its algorithms is to provide a consistent dot size and density. There are, however, times when a slightly oversize dot is desirable, such as when printing areas of solid color, such as in large size type in texts or in areas of images.

There are other times when a slightly undersized dot would be desirable in controlling contrast between light and dark areas, especially in color printing. Rather than require operator intervention to disable, either partially or wholly, the hysteresis correction, it has been determined that by determining which of the next adjacent nibs are printing in the current line and by determining which printed in the prior line and will print in the next, future line, a number can be generated which affects the generation of the printing interval $\pi_i$, where i ranges from 1–n, where n may be 15.

FIG. 12 is a diagram of a suitable mechanization to modify the hysteresis control in response to the activity about a dot to be printed. In FIG. 12a, there is a block showing the nibs that are involved under this mechanization. Information is collected from the eight printing opportunities immediately surrounding the nib in question. That is, the history of the nib $N_0$ and its adjacent neighbors, $N_{-1}$ and $N_{+1}$ is examined for the prior row or line $(N_{0, -1})$, $(N_{-1, -1})$, $(N_{+1, -1})$, and for the next, yet as unprinted row or line $(N_{0, +1})$, $(N_{-1, +1})$, $(N_{+1, +1})$.

Figure 12B:
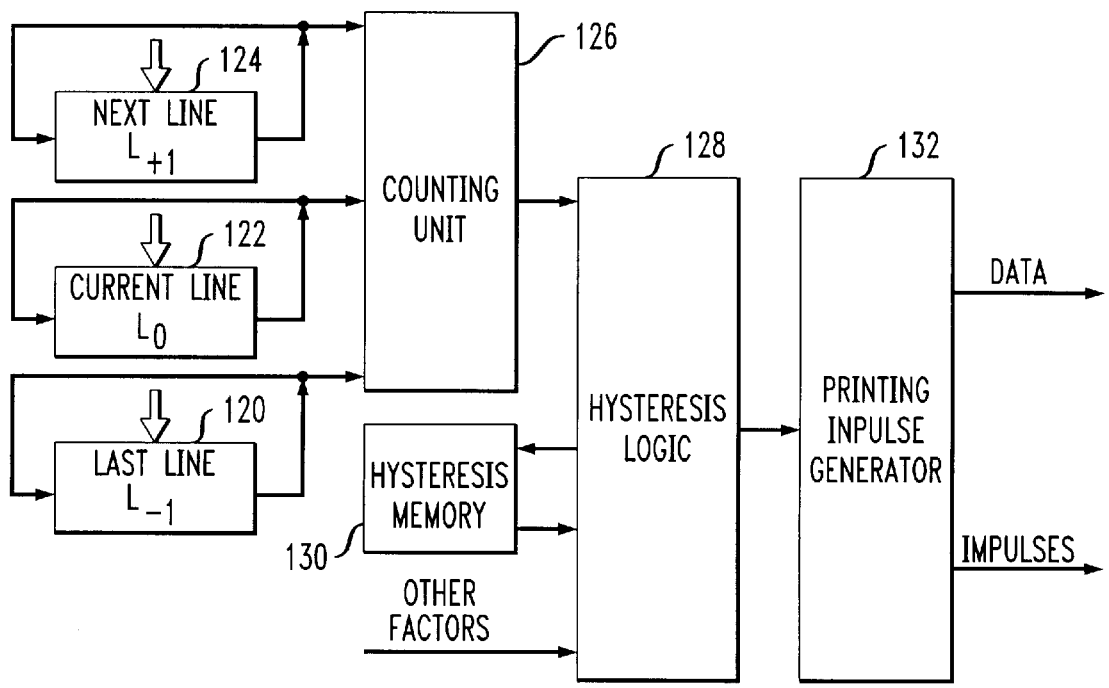

This is illustrated in FIG. 12b in which line registers 120, 122, 124 apply their contents to a counting unit 126 which looks for a print ("1") or not print ("0") bit for the nib $N_0$ and for its adjacent neighbors $N_{-1}$, $N_{+1}$. The output of the counting unit is a number between 0 and 8, since the bit for $N_{0,0}$ is used for the print command. The maximum number 8 is counted if all three nibs printed in the prior row $(R_{-1})$, all three are to print in the current row $(R_0)$ and all three will print in the next row to be printed $(R_{+1})$.

The output of the counting unit is applied to a hysteresis logic unit 128, which also receives inputs from a hysteresis memory unit 130, and from other circuits corresponding to the other factors employed in determining the duration of the printing impulses, such as the circuits concerned with velocity, nib resistance, head temperature and the like. Considering all of these various inputs, as modified by the counting unit output, the hysteresis logic unit 128 sends a command signal to the printing pulse generator 132 which can apply the printing data and the printing pulses, $\pi_1$–$\pi_n$, (in this example, n=5) to the nibs.

The extent to which the numerical count of the counting unit 126 affects the selection of the printing pulses $\pi_1$–$\pi_5$ is a matter of design choice and may involve the subjective judgment of the operator of the printer. However, this factor acts as an electronic contrast adjustment which can be within the control of the operator when it is enabled.

In dealing with hysteresis control using printing pulses of different duration, it has been assumed that the web speed is such that the longer printing pulses will be completed during the interval that the dot row being printed is adjacent the print head and before the occurrence of the next actuating signal which indicates that the next row is ready to be printed.

If the web speed is increased, there may be a time when the time allocated to printing is less than the longest duration impulse, which may be necessary to print with a "cold" nib. By examining the unprinted portion of the data and considering the printing history of a nib and possibly that of the neighbors, it is possible to determine when the longer printing pulses are required and by how much the printing can be anticipated. For example, if a $\pi_n$ pulse has a duration that is greater than the time allocated to one or two lines, by "looking ahead", a necessary $\pi_n$ pulse can be commenced one or more lines "early" so as to terminate with the shorter print pulses of that same line.

Figure 13:
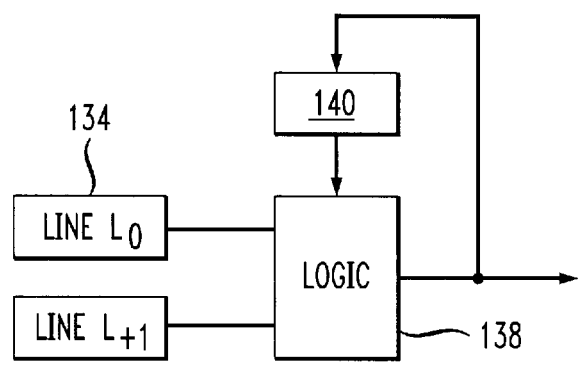
FIG. 13 is a diagram of a logic circuit that permits operation at increased speed or resolution.

Since the structural limitations of available thermal printing heads limit the current that can be applied to individual nibs and further require that a 50% duty cycle be observed, the time required to melt wax for a single dot with a hot nib cannot be greater than one half of the time allocated to a single line at the speed of the web and the resolution of the printer. FIG. 13 illustrates a logic circuit that permits operation at increased speed or resolution. As shown in FIG. 13, a first register 134 stores the data for a current line $L_0$, while a second register 136 stores the data for the next line $L_{+1}$ which is yet to be printed.

The registers 134, 136 apply their data for the nib in question to a predictive logic circuit 138. A history store 140 provides an input to the predictive logic circuit 138, the output of which is fed back to the history store 140 to update its contents. The history store 140 can retain up to n lines of information, each representing whether a print pulse command was applied in successive earlier lines. Here, n=5 and the longest print pulse will be $\pi_5$.

The rules of operation are if the nib is to print, the contents of the history store 140 are each forced to a "1" value. For each line that is not printed, each of the stored numbers is incremented by "1". If the nib is "hot", and the current line is to be printed, the shortest print pulse $\pi_1$ will be commanded. If the nib is "cold", the print pulse $\pi_5$ was commanded in the prior line and will continue. If, the nib is "cold" and the present line is not to be printed but the next line, $N_{+1}$ is to print, then the print pulse $\pi_5$ is commanded to commence in this line.

At higher speeds, it may be necessary to modify the circuit to look two lines ahead and to start the longest print pulse $\pi_5$ two lines early and to start shorter print pulses, i.e. $\pi_4$ or $\pi_3$, at least one line early. Since the encoder 24 provides multiple pulses per line, a pulse can be started within prior lines.

An alternative to the use of printing pulses of different durations would be to use short maintenance pulses $\pi_m$ every line when not printing to maintain the nibs at a temperature just below $T_{melt}$. The shortest printing pulse $\pi_1$ will then be adequate to print at any time, no matter what the printing history of the nibs. This alternative is illustrated in FIG. 14 which includes FIGS. 14a and 14b.

Figure 14A:
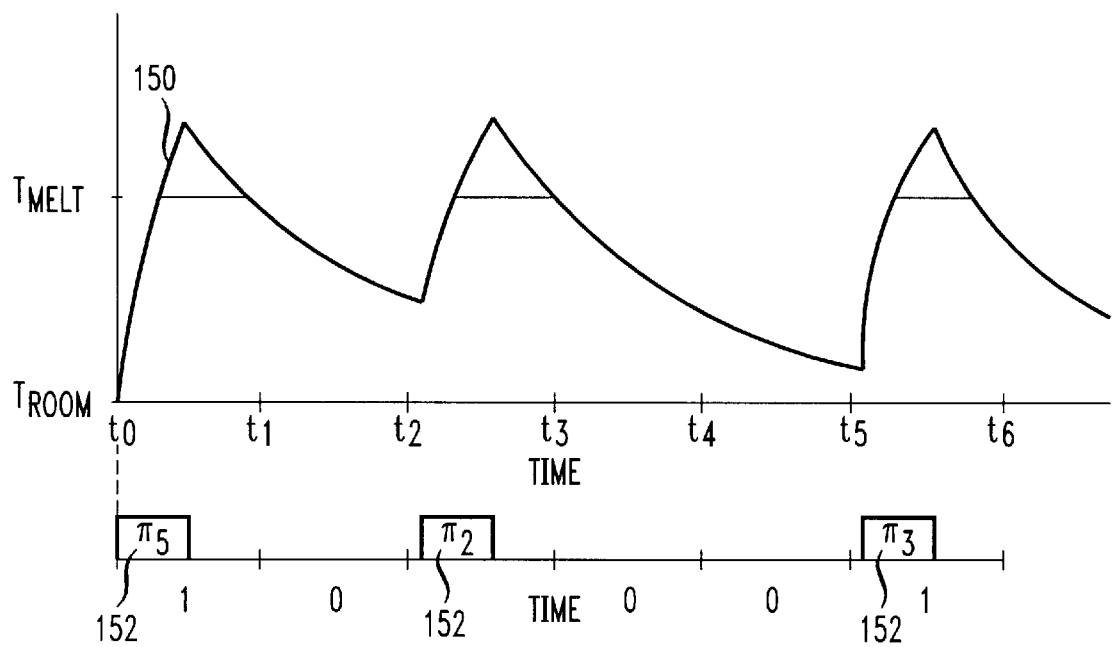
FIGS. 14a and 14b is a set of graphs drawn to a common time base illustrating hysteresis based on temperature maintenance.

Turning first to FIG. 14a, there are shown in graphs drawn to a common time base, the temperature of a nib 150 and the data signals 152 which control printing. As shown, during times $t_0/t_2$ and $t_n$, a "1" signal is provided for printing while at times $t_1$, $t_3$ and $t_4$ a "0" signals that no dot is to print. As illustrated, the nib has cooled to room temperature $T_{room}$ and a maximum pulse $\pi_5$ is applied to drive the nib temperature sufficiently above $T_{melt}$ to create a printed dot during the interval. During the next interval, $t_1$, the nib cools to a level requiring a $\pi_2$ pulse to print at $t_3$. For the next two intervals, the nib is again permitted to cool so that at time $t_5$, a $\pi_3$ pulse is required.

Figure 14B:
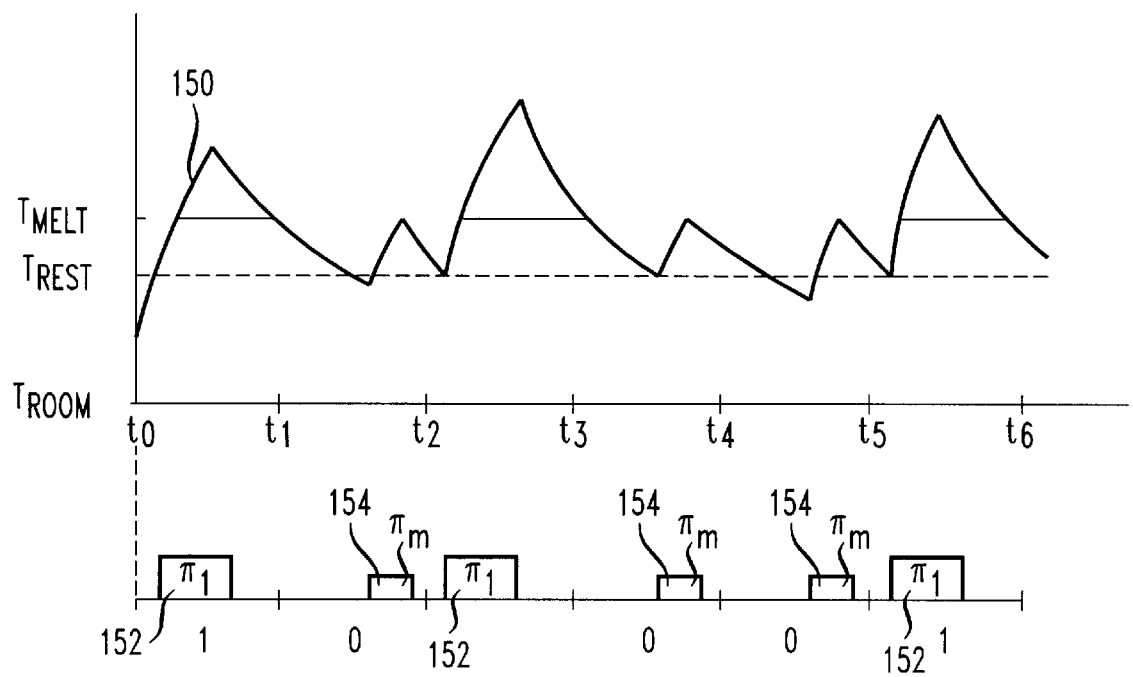

With the alternative, "constant temperature" approach illustrated in FIG. 14b, given the same printing data, at $t_0$ the nib is at a nominal "resting" temperature, $T_{rest}$ which is slightly below $T_{melt}$. The nib may be considered "hot" so that a minimum $\pi_1$ pulse can be employed. During $t_1$, since no print command is in the data line, a maintenance pulse $\pi_m$ 154 is applied which brings the nib temperature back to $t_{rest}$. The print command at $t_2$ is applied to a nib that is still "hot" and a $\pi_1$ can be used to print.

In each of the succeeding time intervals, $t_3$ and $t_4$, maintenance pulses $\pi_m$ 154 are applied, heating the nib so that the temperature cycles about $T_{rest}$. However, this temperature is sufficient for the pulse $\pi_1$ to be effective when the nib is next commanded to print by a data signal 152. The maintenance pulse $\pi_m$ 154 is applied late in the print interval so that a brief interval is provided in which the nib will cool before the next printing pulse is applied.

This alternative can be varied by using more than one maintenance pulse. For example, if the effects of history and neighbors requires that a maintenance pulse of shorter duration or lesser magnitude than $\pi_m$ to avoid melting wax and printing a partial dot, then a second maintenance pulse $\pi_m$, can be implemented for such conditions which empirically determine that the nib temperature is so close to $T_{melt}$ so as to preclude the use of the normal maintenance pulse $\pi_m$.

In a printer according to one embodiment of the present invention, the print head is provided with one or more thermistors to sense and signal print head temperature to the CPU. Since the temperature of the head will affect the rate of thermal transfer from nib to nib and from nib to the heat sink to which the head is mounted, the temperature representing signals from the thermistors are made a factor in the selection of the appropriate printing pulse. Circuits can provide for a shorter printing pulse if the regional temperature is elevated, affecting the rate of cooling of the nibs in the region.

One parameter that affects the magnitude of any print pulse is the electrical resistance $r_i$ for each nib $N_i$. It is possible to test serially all of the nibs to determine the resistance of each and to store the information in a "look up" table. One can determine a nominal thermal value for each nib which will permit a "cold" nib to print with a $\pi_5$ pulse. If the resistance of a particular nib is greater than a predetermined set value, then the current through the nib with a given voltage will be less and the energy, which depends upon the current squared ($E=I^2R$). Accordingly, for that nib, the duration of the print pulse will have to be increased to apply the same amount of heat energy to the wax ribbon. Similarly, a nib with less resistance will pass more current and apply more energy to the wax ribbon.

The modification of the printing interval that is necessary to equalize the energy transfer of all of the nibs can be computed and stored as a correcting factor in the look up table with a correcting value associated with each nib. It is then possible, during printing, to increase or decrease the duration of the $\pi_1$ through $\pi_n$, print pulses for each nib so that each nib supplies the same amount of thermal energy to the wax ribbon during the printing interval.

A different, but related problem arises if the common potential or ground busses of the print head are less than perfect and contribute a voltage drop, thereby reducing the energy available to the printing nibs. A "perfect" solution would determine the total energy required for all of the nibs by calculating the "correction" for each nib and would apply the correction to each nib but this would be complex and is not presently cost effective.

Figure 15:
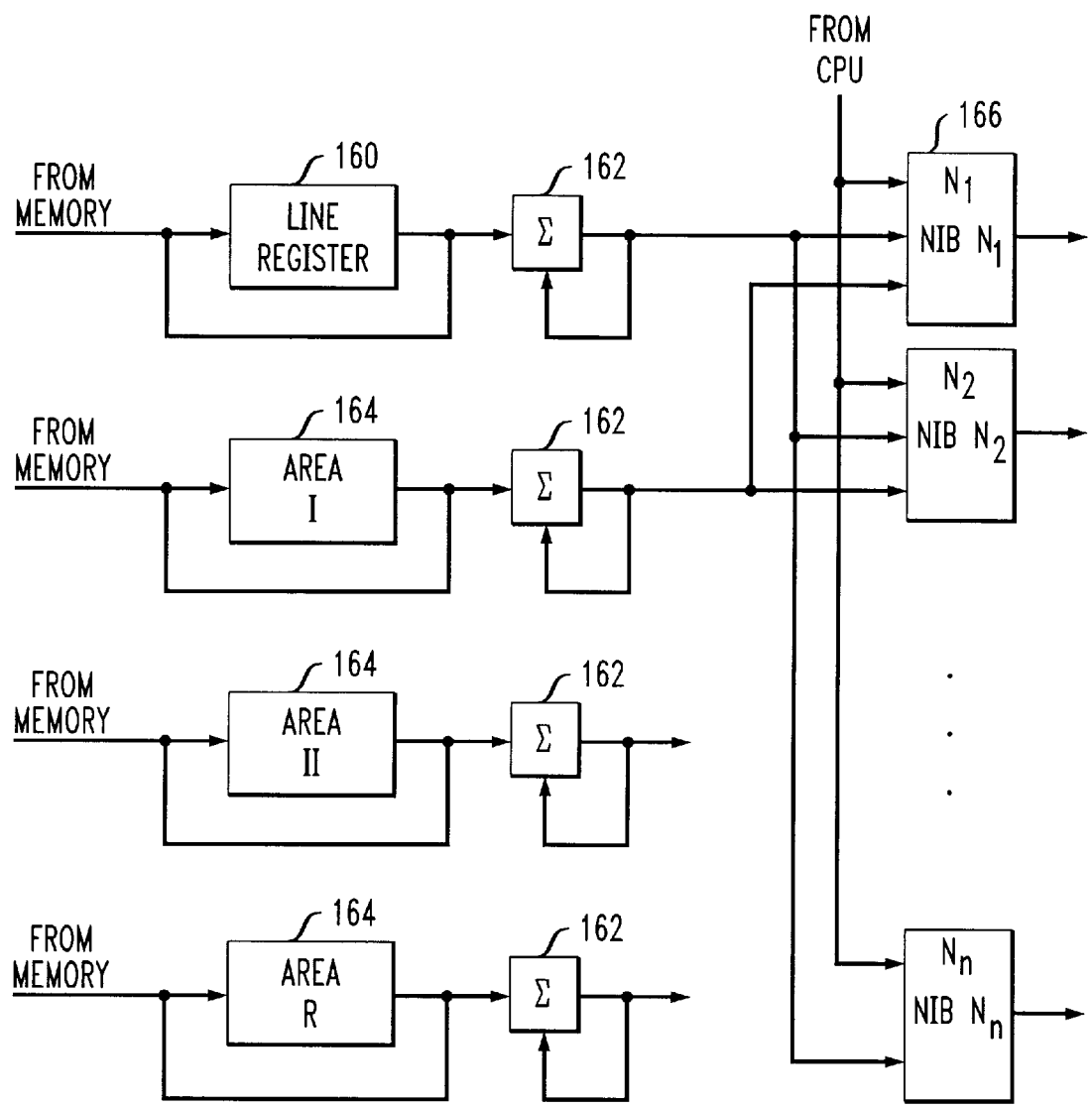
FIG. 15 is a block diagram of circuits which correct for current insufficiencies.

A more practical solution is illustrated in FIG. 15 in which a line to be printed is stored in a line register 160. The "1's" stored in the register 160 are summed in a summing device 162 to determine the total energy that will be required to print the line. The print head is then subdivided into areas and the data for all of the nibs in each area is stored in a plurality of area registers 164. The energy for each area is summed in a summing device 162.

An energy circuit 166 is provided for each nib $N_1$ to $N_n$ and receives as inputs, the total energy required for the line from the summing device 162 connected to the line register 160, the energy required for the area in which the nib is located from the summing device 162 connected to the area register 164 and a value representing desired energy which is furnished from the central processor and may even be a function of the resistance of the nib. The energy circuit 166 for each nib then determines the energy necessary to print and supplies a signal to the printing circuits so that the appropriate amount of energy is delivered to the nib at the proper time.

According to the present invention, a thermal printer is described that is capable of reliably printing a spectrum of colors on a web moving at speeds greater than 3 inches per second with a printing density ranging from 300 dpi to 1200 dpi and, if necessary, higher. While an encoder can signal when an increment of web is in position for a printed line, circuits must determine the optimum time to begin a printing pulse as well as the duration and magnitude of that printing pulse.

According to a preferred embodiment, several printing pulses are selectively available and range in duration from a relatively brief pulse to be used when a nib has just printed in the line immediately prior and is considered to be "hot", to a relatively long pulse when a nib has not printed for several lines and may be considered "cold".

Circuits are provided that can examine and evaluate the history of each nib to determine an optimum printing pulse as a function of when the nib was last energized. The circuits may also consider the effect of the nibs immediately adjacent the nib of interest and whether these adjacent, "neighbor" nibs have printed in the prior line or in earlier lines, since their heat will be conducted to the nib of interest. The condition of the neighbor nibs in prior lines may require that less energy need be supplied to the nib of interest in order for it to print.

Other circuits are provided to allow for instantaneous variations in web velocity since these, too, can affect print quality. The encoder that measures increments of web travel can also be used to determine instantaneous velocity which, when compared to a desired constant velocity, can cause an error signal to be generated that can modify the instigation and termination of a printing pulse.

For optimum quality, it has been determined that the several printing pulses of differing duration that are required to allow for hysteresis should terminate together. Accordingly, a succession of strobing or clocking pulses are provided during a printing interval and those nibs that are to have the longer lasting pulses are energized by earlier clocking pulses. Those nibs that receive shorter pulses are energized by later clocking pulses so that all nibs are de energized simultaneously.

An alternative method of treating the problem of "cold" versus "hot" nibs is to provide a maintenance pulse to every nib in every interval that it is not scheduled to print. This way, the shortest printing interval is always adequate since no nib is permitted to become "cold". A variation of this method allows for a contribution of heat from adjacent nibs and from executing a print instruction in the prior line. The variation permits a limited choice of printing pulses depending upon whether a nib and its neighbors are experiencing several lines of inactivity and are being maintained or whether the nib and its neighbors have been printing over several lines and are "hot" from continued activity just prior to the line in question.

To allow for higher web speeds, lines that are yet to print are examined for those situations in which a nib is to print after several lines of inactivity and a printing pulse of maximum duration may extend beyond the interval allocated to print a line at the higher speed. In this situation, a longer printing pulse may be commanded one or two lines early so that it will print when required. Since the encoder can subdivide a line into several increments and since data memories and registers can be accessed to provide the information relating to future lines, a print pulse can be commenced sufficiently early to have the desired effect at the appropriate time.

It is also possible, by examining the history of a nib and its neighbors, as well as the future of the nib and its neighbors, to adjust the size of the dot to be printed where areas of color are to be printed. In some cases, it is necessary for a dark, solid color that all dots be slightly oversize. In other instances where there are areas in which the color is less bright or intense, it would be desirable that the dots be at their proper size or slightly undersized. Appropriate circuits which examine past, present and future lines can determine which of several printing pulses should be employed to obtain a desired effect.

Because of quality variations in the fabrication of printing heads, the resistance of each nib of a head may not be equal to a desired or specified resistance, or the manufacturing tolerances may permit a limited variation in nib resistance. Since such variations can affect print quality, the resistance of individual nibs can be measured and correcting values for each nib can be stored in a look up table. During printing, the look up table can be consulted to determine for each nib what, if any, corrective action must be taken to assure even, uniform printing.

Thus there has been shown a control system for a thermal printer that is adapted to print high resolution color on a moving web. Additional modifications and variations will occur to those skilled in the art and, accordingly, the scope of the present invention should be limited only by the scope of the claims appended hereto.

What is claimed as new is:

1. An apparatus for thermal printing having circuits for determining an interval between successive printed marks, a plurality of color printing heads having at least one printing electrode operable in response to applied printing impulses for causing the deposit of a mark upon a medium, and circuits for determining the onset, duration and magnitude of printing impulses applied to the at least one printing electrode, comprising:

data storage means for retaining signals for each printing electrode corresponding to the presence or absence of marks upon the medium;

impulse generating means for generating a plurality of printing impulses, each impulse having a selected duration and magnitude; and printing impulse selecting means coupled to said data storage means and said impulse generating means for choosing one of said plurality of printing impulses for each printing electrode during each interval based upon the data stored in said data storage means.

2. An apparatus for thermal printing having a plurality of printing heads each having at least one printing electrode operable in response to applied printing impulses for causing the deposit of a mark upon a medium, comprising:

data storage device storing signals corresponding to the presence or absence of marks upon the medium;

impulse generator generating a plurality of printing impulses, each impulse having a selected duration and magnitude; and printing impulse selecting circuit coupled to said data storage device and said impulse generator, including a circuit determining a printing interval and a circuit choosing at least one of said plurality of printing impulses for each printing electrode during at least one interval based upon data received from said data storage device.

3. A method for thermal printing using an apparatus having circuits for determining an interval between successive printed marks, a plurality of printing heads having at least one printing electrode operable in response to applied printing impulses for causing the deposit of a mark upon a medium, and circuits for determining the onset, duration and magnitude of printing impulses applied the at least one printing electrode, comprising:

retaining signals for each printing electrode corresponding to the presence or absence of marks upon the medium in a data storage device;

generating a plurality of printing impulses, each impulse having a duration and magnitude; and choosing one of said plurality of printing impulses for each printing electrode during each interval based upon the data stored in said data storage device.

* * * * *